United States Patent [19]
Campbell

[11] Patent Number: 5,394,208
[45] Date of Patent: Feb. 28, 1995

[54] ENVIRONMENTAL ENCLOSURE FOR A CAMERA

[75] Inventor: Dean B. Campbell, Webster, N.Y.

[73] Assignee: Eastman Kodak Company, Rochester, N.Y.

[21] Appl. No.: 141,340

[22] Filed: Oct. 22, 1993

[51] Int. Cl.6 .................... G03B 29/00; G03B 17/07
[52] U.S. Cl. ..................... 354/75; 354/288; 354/64
[58] Field of Search ............. 354/64, 288, 75; 358/98

[56] References Cited

U.S. PATENT DOCUMENTS

| | | | |
|---|---|---|---|
| 2,162,908 | 6/1939 | Bedford et al. | 178/6.8 |
| 2,315,406 | 3/1943 | Eddy | 178/7.2 |
| 3,021,385 | 2/1962 | Summerhayes, Jr. et al. | 178/6 |
| 3,021,386 | 2/1962 | Clark | 178/6 |
| 3,097,263 | 7/1963 | Lintern | 178/7.1 |
| 3,515,046 | 6/1970 | Ippolito et al. | 95/11 |
| 3,520,238 | 7/1970 | Webb | 95/11 |
| 4,381,144 | 4/1983 | Breslau | 354/64 |
| 4,394,692 | 7/1983 | Randmae et al. | 358/229 |
| 4,414,576 | 11/1983 | Randmae | 358/229 |
| 4,534,632 | 8/1985 | Laviolette | 354/64 |
| 4,771,299 | 9/1989 | Gell, Jr. | 354/64 |
| 4,853,722 | 8/1989 | Gell, Jr. | 354/64 |
| 4,918,472 | 4/1990 | Reed | 354/64 |
| 4,961,111 | 10/1990 | Herlitz et al. | 358/100 |
| 4,984,089 | 1/1991 | Stiepel et al. | 358/229 |
| 5,107,286 | 4/1992 | Sergeant et al. | 354/64 |
| 5,115,263 | 5/1992 | Bernhardt et al. | 354/81 |
| 5,285,894 | 2/1994 | Kamata et al. | 354/64 |

Primary Examiner—Michael L. Gellner
Assistant Examiner—Nicholas J. Tuccillo
Attorney, Agent, or Firm—Thomas H. Close

[57] ABSTRACT

An environmental enclosure provides a maintenance free surfaceless viewing window through a specially designed aperture for a clean, clear field of view for the lens of an enclosed camera, as well as cooling and isolation from ambient and camera-generated temperatures. The environmental enclosure device utilizes a method of pressurizing the environmental internal to the device to create a positive air flow through the aperture. The aperture is designed to create a vortex in order to encourage a surfaceless barrier which prevents external contaminants from entering the device. The aperture is provided through a removable aperture plate for ease in maintenance. The device provides unabated camera access through a removable portion which is angularly split from a fixed portion of the device, wherein the angular split permits the removal of the sufficient portion of the device in a tight-fitting region.

20 Claims, 4 Drawing Sheets

ENVIRONMENTAL ENCLOSURE FOR A CAMERA

FIELD OF THE INVENTION

The present invention relates to an environmental enclosure device for a camera and, more particularly to an environmental enclosure device which maintains the optical integrity of a field of view of an enclosed camera.

BACKGROUND OF THE INVENTION

In the related art, camera systems are utilized for scanning moving surfaces, such as a freshly fabricated sheet of steal or aluminum, in order to monitor an analysis the moving surface for quality control purposes. For instance, a moving surface such as a freshly fabricated sheet of aluminum may be passed in front of camera system for the purpose of scanning the sheet of aluminum for defects. The defects could include external contaminants embedded in the aluminum sheet. In this example, the newly fabricated aluminum sheet passes infront of the camera system at a rate exceeding 1,000 feet per minute; oil and mist from the fabrication process is exists on the sheet and in the environment surrounding the camera. Furthermore, the environment typically exceeds a temperature of 150° F.

The camera system is required to scan this moving surface under these adverse conditions. However, in this harsh environment, oil, dust, and other contaminants tend to accumulate on a lens of a scanning camera thereby destroying the optics of that lens. Moreover, mist or smoke between the scanning lens and moving surface tend to obscure the field of view of the scanning lens of the camera. This obscured field of view results in an inferior quality scan.

One approach to overcoming the accumulation of oil, dirt and other contaminate on the scanning lens of the camera is to place a piece of glass or other protective covering in front of the scanning lens. In this case, the camera is generally placed inside of a protective box and the lens views through an aperture covered by the glass or protective covering. However, even though the glass covering in front of the lens does in deed keep the lens itself becoming dirty, the glass covering becomes dirty and obscures the optics of the lens. Furthermore, a glass covering in front of the lens does not keep the mist and smoke between the lens and the moving surface from obscuring the lens. As a result, the glass covering requires high maintenance in terms of continuously cleaning the oil and contaminants from the glass surface without eliminating the smoke and mist occlusions.

Another approach to maintaining the optical integrity of the scanning lens of the camera is to put air curtains on the lens. The air curtains provide a screen of moving air between the scanning lens and the moving surface. However, the air curtains tend to mix compressed air with air from the environment surrounding the camera. Because the air from the environment surrounding of the camera tends to be oily, dirty and contaminated, these contaminants nonetheless tend to accumulate on the scanning lens over time. Furthermore, the air curtains did not protect the camera system from the harsh temperatures experienced in the environment.

PROBLEM TO BE SOLVED BY THE INVENTION

A need is therefore been felt for an environmental enclosure device for maintaining the optical integrity of a field of view of an enclosed camera in an environment typically including smoke, mist, oil, dust, and other contaminants, as well as for insulating the enclosed camera from ambient environmental conditions which typically encounter a 130° F. 150° degree temperature range.

SUMMARY OF THE INVENTION

It is therefore an object of the present invention to provide a device which protects the lens and other components of a camera from adverse environmental conditions.

It is a feature of the present invention to provide an environmental enclosure device for maintaining the optical integrity of the field of view of the enclosed camera.

It is a further feature of the present invention to provide a method of keeping a lens of a camera clean, thereby maintaining the optical integrity of the field of view of the camera, by surrounding a camera with a box equipped with an exit aperture, then diffusing air into the box to create a positive air pressure internal to the box, whereby when air exits the aperture the entrance of external contaminants through the aperture into the box is prevented.

It is a further feature of the present invention to provide an environmental enclosure device which protects and insulates an enclosed camera from ambient temperatures. The present invention eliminates the need for a glass or otherwise clear covering placed in front of the lens of the enclosed camera for purposes of keeping contaminants from accumulating on the lens. Further, the present invention insulates an enclosed camera from high temperatures external to the enclosure device by injecting compressed air into the enclosure device, thereby creating a positive air pressure which exists from a specially-designed aperture in the environmental device, wherein the compressed air, which is cooler than the external to the device, cools the temperature internal to the device and surrounding the camera.

A preferred embodiment of the present invention is an environmental enclosure divide for maintaining the optical integrity of a field of view of an enclosed camera, said environmental enclosure device comprising: a box which provides protection from an external environment, wherein said box is angularly split to provide ease of accessibility to said enclosed camera; and air diffuser coupled to said box, wherein said air diffuser provides an inflow of air which creates a positive air pressure internal to said box; and an aperture provided in said box through which a positive flow of air from said air diffuser exits said box, thereby providing a surfaceless barrier which prevents the entrance of external contaminants through said aperture into said box. A preferred embodiment provides said aperture through an aperture plate, wherein said aperture plate is removable from said box, and wherein said aperture is shaped to create a vortex which discourages the entrance of external contaminants through said aperture into said box.

ADVANTAGEOUS EFFECTS OF THE INVENTION

An advantage of the present invention is an elimination of a glass or other covering in front of the camera lens, wherein the covering to otherwise needed to keep the lens clean.

Another advantage of the present invention is that air which is cooler than the ambient temperature external to the present invention moves around internal to the present invention, thereby surrounding an insulating the enclosed camera from the external ambient conditions, which can typically reach temperatures of 130° to 140° F.

Another advantage of the present invention is increased accessibility to the enclosed camera when the present invention is mounted in tight or close-fitting mounting situations, as provided by a preferred embodiment of the present invention which splits in half diagonally, thereby permitting the removal of a sufficient portion of the present invention in a close-fitting mounting situation.

Another advantage of the present invention is ease in maintenance of the camera system enclosed by the present invention.

A further advantage of the present invention is the provision of the virtually maintenance-free viewing window through a specially-designed aperture.

BRIEF DESCRIPTION OF THE DRAWINGS

The advantages and features of the present invention will become better understood with reference to the following more detailed description and claims taken in conjunction with the accompanying drawing in which like elements are identified with like symbols and in which:

DESCRIPTION OF THE PREFERRED EMBODIMENTS

DETAILED DESCRIPTION OF THE FIGURES

Figure 1A:
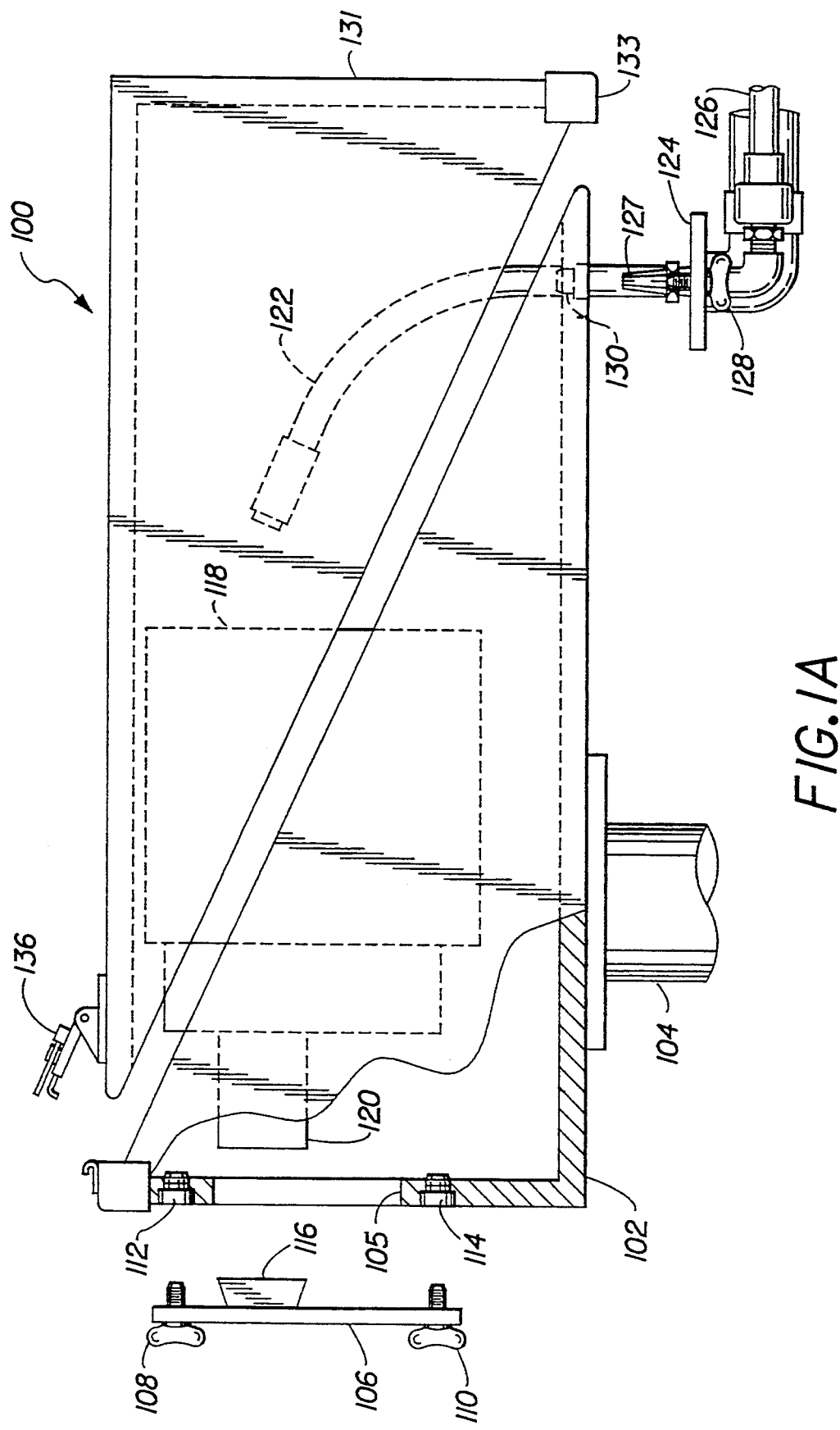
FIG. 1A is a side view of a preferred embodiment of an environmental enclosure device for a camera, wherein a first portion is coupled to a removable portion as well as to a removal aperture plate, each shown removed therefrom, according to the present invention.

Referring now to FIG. 1, a side view of a preferred embodiment of an environmental enclosure device 100 is shown, according to the present invention. A first portion 102 is fixed on a bracket 104. In a preferred embodiment, the first portion 102 has an orifice 105 over which an aperture plate 106 is placed and affixed to the first portion with bolts 108, 110 threaded into orifices 112, 114, and bolts 109, 111 (shown in FIG. 2) threaded into orifices 113, 115 (not shown). The aperture plate is equipped with an aperture 116 which is shaped to create a vortex of air exiting from the aperture, thereby minimizing and preferably eliminating negative air pressure at the aperture, resulting, for instance, from eddying effects otherwise occurring when positive air pressure exits the device. As shown in FIG. 1, the vortex aperture 116 has a tapered shape with the large end of the taper arranged towards the inside of the enclosure.

A camera 118 is positioned within the first portion such that a camera lens 120 has a surfaceless viewing area out of the aperture 116. A cable 122 for controlling the camera 118 is affixed to an air supply pate 124 and extends through the plate and the first portion to attach to the camera as shown in FIG. 1B. An air supply hose 126 is also affixed to the air supply plate 124 and extends through the plate and the first portion as shown in FIG. 1B. An air diffuser 127 is affixed to the air supply hose internal to the first portion 102. The air supply plate with affixed cable 122 and hose 126 is affixed to the first portion with bolt 128 threaded into orifice 130, and similar bolts 132, 136 threaded into orifices 134, 138 as shown in FIG. 2.

A second portion 131 is placed over the camera 118 and completes the enclosure by coupling with the first portion 102 at an attachment hinge 133 and at least one clasp 136. As shown in FIG. 1B, the camera 118 and lens 120 is completely enclosed within the environmental device 100. The lens 120 is positioned away from the aperture 116 in order to provide an exit area through the aperture 116 of air pumped into the device 100 by the air supply hose 126.

Figure 2:
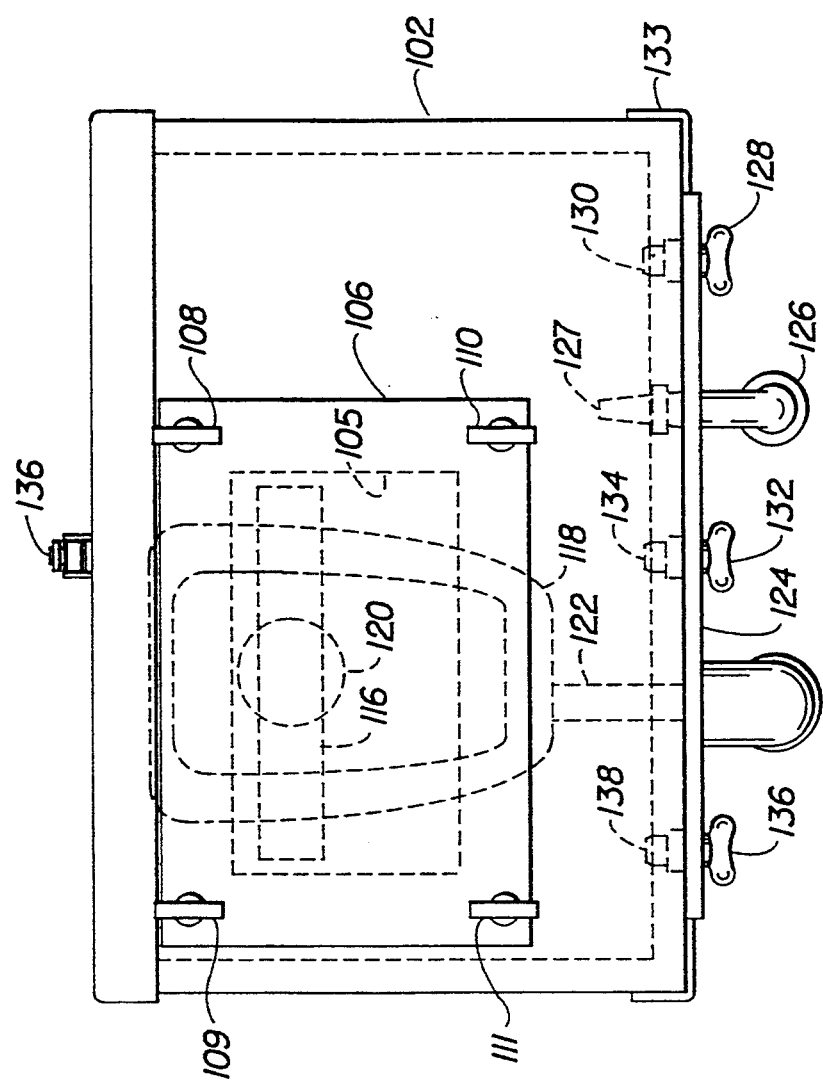
FIG. 2 is a front view of the environmental enclosure device showing the design of the removable aperture plate with accompanying aperture through which a surfaceless viewing area for a camera lens is provided, according to the present invention.

Referring to FIG. 2, a front view of the environmental enclosure device 100 is shown. The removable aperture plate 106 covers the orifice 105 which is cut into the first portion of the device 100, and the plate 106 is affixed to the first portion 102 with bolts 108-111. The aperture 116 is designed into the aperture plate 106 to cover a smaller area than the orifice 105 covers, thereby narrowing the surfaceless viewing area that the lens 120 would otherwise view through the orifice 105 without the plate 106. The ability to remove the plate 106 eases access to the camera 118 and lens 120 without removing the camera and lens from the first portion 102, as well as eases the replacement of the aperture plate 106, for instance, to replace the plate with a new plate equipped with an identically-shaped or differently-shaped aperture 116. Also shown in FIG. 2 is the air supply hose 126, the air diffuser 127, and the air supply plate 124 affixed to the first portion 102 with the bolts 128, 132, 136 threaded into orifices 130, 134, 138.

OPERATION OF THE PREFERRED EMBODIMENTS

Figure 1B:
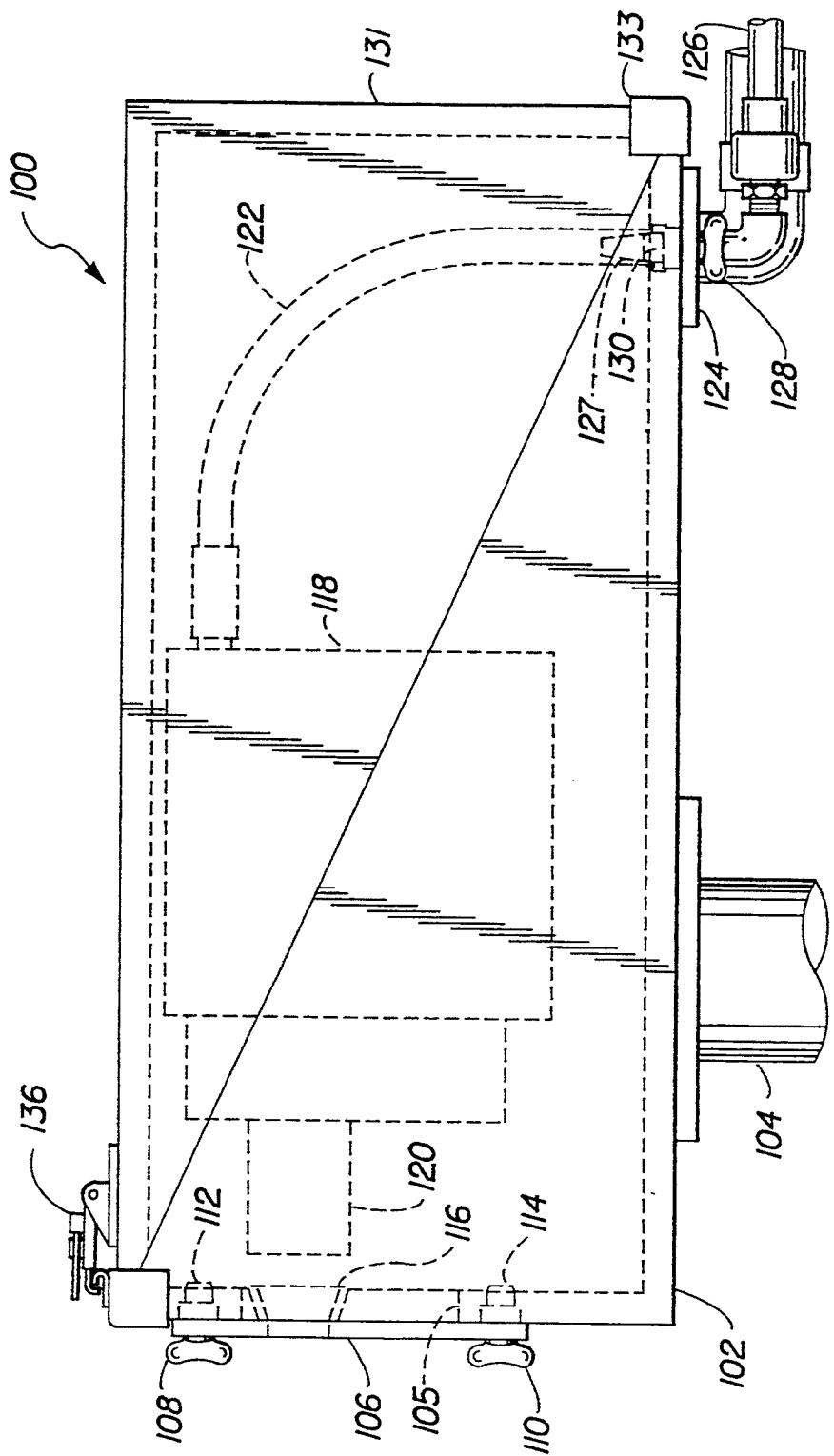
FIG. 1B is a side view of the environment enclosure device of FIG. 1A wherein the removable portion and aperture plate is shown coupled to the first portion.
Figure 3:
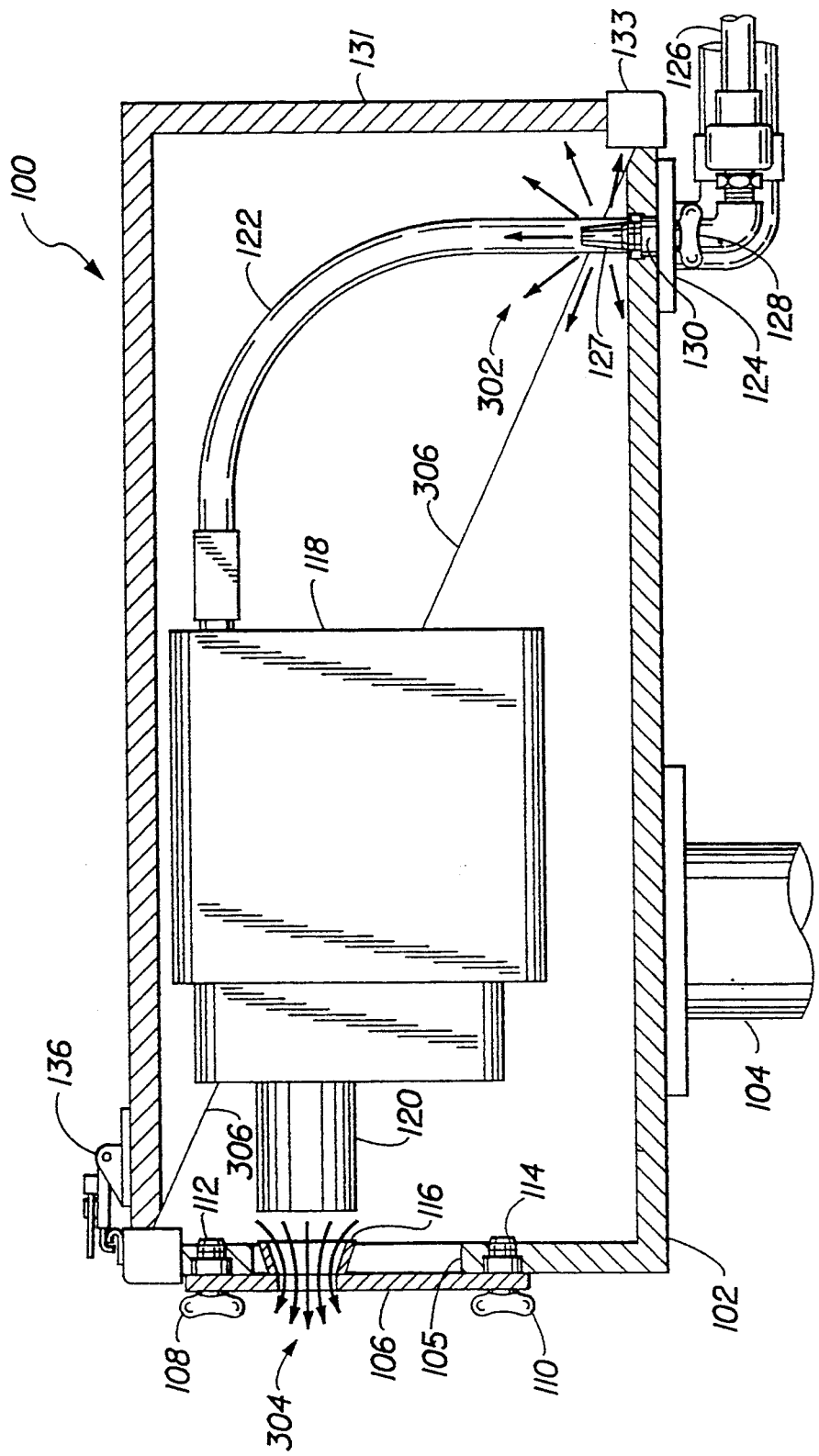
FIG. 3 is a cut-away side view of an environmental enclosure device for a camera, wherein a direction of flow of a positive air pressure from a connected air supply is shown passing outwardly through a aperture in a connected aperture plate, according to the present invention.

FIG. 3 is a cut-away side view of the environmental enclosure device shown in FIGS. 1A-2. FIG. 3 facilitates a discussion of the operation of the preferred embodiments of the present invention by showing a direction of flow of a positive air pressure from the air diffuser 127. Air supplied from the air supply hose 126, preferably at an air pressure of about 30 pounds per square inch and a flow of about 6 cubic feet per minute, is diffused in all directions from the air diffuser 127, as illustrated by the directional arrows 302. Because the exit aperture 116 is larger than the air diffuser 127 through which the air is supplied, the air exits through the aperture at a pressure lower than that which the air was supplied. However, the air pressure of the exiting air is significant enough to keep the lens 120 clean and obstructionfree under anticipated conditions.

The pressurized air which is supplied to the device 100 internally pressurizes the device 100. Because the pressurized air is generally cooler than the external ambient temperature, the pressurized air also cools and insulates the environment within the device 100 from the environment external to the device. In essence, the air internal to the device 100 keeps the lens 120 clean as well as becomes a transferor of heat and a protector to the camera 118. The aperture 116 is designed to encourage positive air flow out of the device 100 through the aperture 116 in the direction shown by directional arrows 304. This design of the aperture creates a vortex which discourages flow from negative air pressure into the aperture as previously described. The lens 120 is positioned sufficiently away from the aperture to permit an unobstructed flow of air around the lens 120 and out through the aperture 116. Minimal air flow out of a seam 306 which is unsealed will not significantly affect the advantages provided by the present invention.

Finally, a preferred embodiment of the present invention has the first portion 102 angularly split from the second portion 131, as shown in FIGS. 1A, 1B &3, thereby resulting in the seam 306 when the portion 131 is joined with the portion 102. This angular-split provides accessibility to camera controls (not shown) located on the camera 118 when the camera is positioned within the first portion 102. The angular split permits the second portion 131 to be removed from the first portion 102 in tight-fitting situations by unclasping the clasp 136 and then moving the second portion 131 enough distance to clear the end of the first portion 102 which is surrounded by the attachment hinge 133. This distance is generally about 1 cm. Thus, the second portion 131 can be removed even in situations where, for instance, the device 100 is mounted with a structural beam or wall in close proximity to the second portion 131. When the second portion 131 is removed, complete access to camera controls located on the camera 118 is available without disturbing the positioning of the camera within the first portion 102.

The foregoing description is included to illustrate the operation of the preferred embodiments and is not meant to limit the scope of the invention. The scope of the invention is to be limited only by the following claims. From the foregoing description, many variations may be apparent to those skilled in the art that would yet be encompassed by the spirit of the scope of the invention.

PARTS LIST FOR FIGS. 1-3

100=ENVIRONMENTAL ENCLOSURE DEVICE
102=FIRST PORTION
104=BRACKET
105=ORIFICE
106=APERTURE PLATE
108, 109, 110, 111=BOLT
116=APERTURE
118=CAMERA
120=CAMERA LENS
122=CABLE
124=AIR SUPPLY PLATE
126=AIR SUPPLY HOSE
127=AIR DIFFUSER
128=132, 136=BOLT
130=134, 138=THREADED ORIFICE
131=SECOND PORTION
133=ATTACHMENT HINGE
302, 304=DIRECTIONAL ARROWS
306=SEAM

What is claimed is:

1. An environmental enclosure device for maintaining the optical integrity of a field of view of an enclosed camera, said environment enclosure device comprising:
    a box which provides protection from an external environment and ease in accessibility to said enclosed camera;
    an air diffuser coupled to said box, wherein said air diffuser provides an inflow of air which creates a positive air pressure internal to said box; and
    a vortex aperture provided in said box through which a positive flow of air from said air diffuser exits said box, thereby providing a surfaceless barrier which prevents the entrance of external contaminants through said aperture into said box, said vortex aperture having a tapered shade with the large end of the taper arranged towards the inside of said enclosure.

2. The environmental enclosure device according to claim 1, wherein said aperture provides a surfaceless viewing area for a lens of said enclosed camera.

3. The environmental enclosure device according to claim 1, wherein said box is angularly split to provide ease accessibility to said enclosed camera.

4. The environmental enclosure device according to claim 1, wherein said air diffuser provides compressed air.

5. The environmental enclosure device according to claim 4, wherein said compressed air is 30 pounds per square inch with a flow rate of approximately 6 cubic feet per minute.

6. The environmental enclosure device according to claim 5, wherein said compressed air maintains a first temperature within said box below a second temperature external to said box.

7. The environmental enclosure device according to claim 1, wherein said aperture plate is created by an aperture plate.

8. The environmental enclosure device according to claim 7, wherein said aperture plate is removable.

9. The environmental enclosure device according to claim 1, wherein said aperture is shaped to create a vortex of said flow of air exiting said box.

10. The environmental enclosure device according to claim 9, wherein said vortex discourages flow of air through said aperture into said box.

11. A method of maintaining the optical integrity of a field of view of an enclosed camera, said method comprising the steps of:
    1) providing a box equipped with a vortex aperture, wherein said box surrounds an enclosed camera which is positioned to receive a field of view through said aperture, said vortex aperture having a tapered shade with the large end of the taper arranged towards the inside of said enclosure; and
    2) diffusing air into said box to create a positive air pressure internal to said box, wherein said air exits said box through said vortex aperture, thereby providing a surfaceless barrier which prevents the entrance of external contaminants through said aperture into said box.

12. The method according to claim 11, wherein said aperture provides a surfaceless viewing area for a lens of said enclosed camera.

13. The method according to claim 11, wherein said box is angularly split to provide ease of accessibility to said enclosed camera.

14. The method according to claim 11, wherein said diffusing step provides compressed air.

15. The method according to claim 14, wherein said compressed air is approximately 30 pounds per square inch with a flow rate of approximately 6 cubic feet per minute.

16. The method according to claim 15, wherein said compressed air maintains a first temperature within said box below a second temperature external said box.

17. The method according to claim 11, wherein said aperture is created by an aperture plate.

18. The method according to claim 17, wherein said aperture plate is removable.

19. The environmental enclosure device according to claim 11, wherein said aperture is shaped to create a vortex of said flow of air exiting said box.

20. The environmental enclosure device according to claim 19, wherein said vortex discourages flow of air through said aperture into said box.

* * * * *